March 21, 1961 G. HEYEK 2,975,516
DRY SHAVER HEAD CONSTRUCTION FOR CUTTING LONG AND SHORT HAIR
Filed July 7, 1958 2 Sheets-Sheet 1
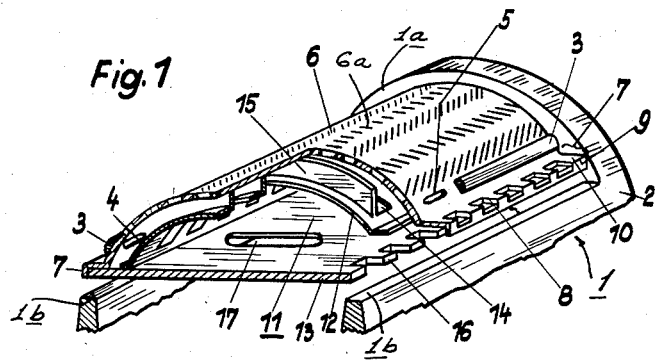
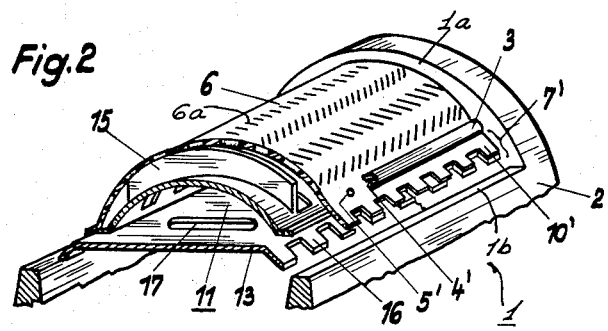
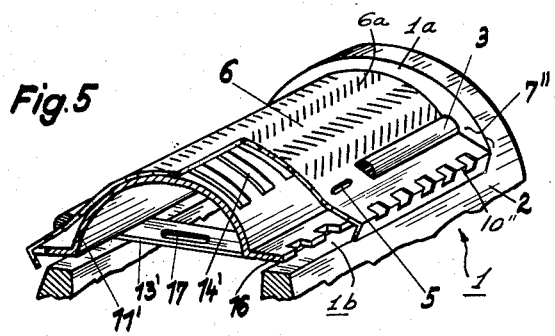
INVENTOR
Gerhard Heyek
BY
Watson, Cole, Grindle & Watson
ATTORNEYS March 21, 1961 G. HEYEK 2,975,516
DRY SHAVER HEAD CONSTRUCTION FOR CUTTING LONG AND SHORT HAIR
Filed July 7, 1958 2 Sheets-Sheet 2
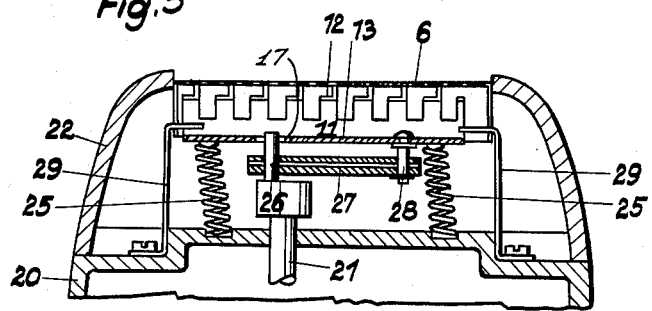
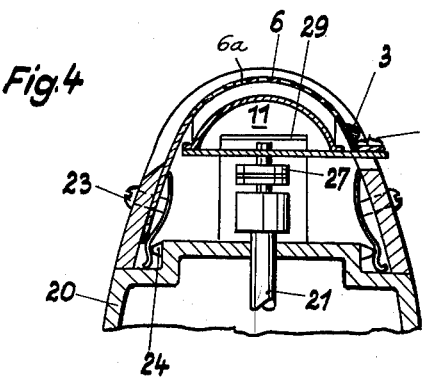
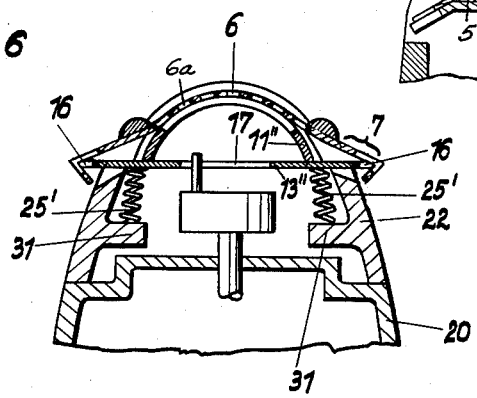
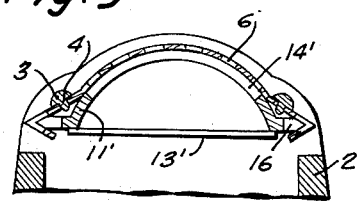
INVENTOR
Gerhard Heyek
BY Watson, Cole, Grindle & Watson
ATTORNEYS

United States Patent Office 2,975,516
Patented Mar. 21, 1961

2,975,516

DRY SHAVER HEAD CONSTRUCTION FOR CUTTING LONG AND SHORT HAIR

Gerhard Heyek, 116 Babenbergerstrasse, Graz, Styria, Austria

Filed July 7, 1958, Ser. No. 746,849

Claims priority, application Austria July 12, 1957

4 Claims. (Cl. 30—34)

This invention relates to a dry shaver which includes both a close-shaving mechanism and a long-hair cutter. In such a shaver the close-shaving mechanism is formed by an arched shear plate and a cutter blade and resiliently arched against the shear plate and the long-hair cutter is formed by a row of cutting teeth formed along an edge of the inner blade and coacting with other cutting teeth on the cutter head.

It is an object of the present invention to provide a dry shaver of this type in which the parts of the apparatus which are in shear coaction can be made and assembled in a simple manner with considerable tolerances and without requiring to be precisely ground, while at the same time there is achieved an efficient cutting action in both the close-shaving and the long-hair cutter. In addition, it is an object to provide such a shaver in which shaving pressure on the close-shaving mechanism will relieve or reduce the frictional engagement between the moving parts of the long-hair cutter or cutters to thereby reduce the over-all power requirements.

According to the present invention, the shear plate is formed of resiliently flexible sheet material occupying an opening in the cutter head and supported along at least one side of the cutter head by a supporting bar which spans the opening in a lengthwise direction. Both the shear plate and the inner cutter have cooperating toothed side edges extending laterally through the space between the said bar and the adjacent opening in the cutter head and thence project outwardly from the cutter head.

The resiliently flexible shear plate is supported by said bar generally along a line extending between the close-shaving mechanism and the long-hair cutter, so that the parts of the shear plates on opposite sides of the bar can deform or flex about the bar in directions which depend upon which cutter is in use at a given time. In this way, an excellent coaction of the shear plate and inner blade is ensured. For instance, when the close-shaving mechanism is used, the arched part of the shear plate will be deformed under the shaving pressure and will automatically conform to the shape of the blade within the shearing area. The cutting teeth of the shear plate constituting a part of the long-hair cutter will normally be in snug engagement with the cooperating teeth of the inner cutter when there is no shaving pressure against the arched medial portion of the plate. This insures an efficient shearing action during use of the long-hair cutter or cutters. However, during use of the close-shaving mechanism, the shaving pressure on the arched portion of the plate will normally flex the plate in such manner about the supporting bar or bars as to relieve the pressure between the relatively moving toothed portions of the long-hair cutter or cutters, thereby reducing the friction between these parts. Examples of cutter heads in accordance with the invention are illustrated in the accompanying drawings in which:

Figures 1 and 2 are respective views, each with parts broken away and/or shown in section illustrating two slightly different forms of the invention;

Figure 3 is a longitudinal sectional view of a third form of the cutter head in accordance with the invention;

Figure 4 is a cross-sectional view of the cutter head shown in Figure 3;

Figure 5 is a view similar to Figures 1 and 2, showing a further modified form of the cutter head;

Figure 6 is a cross-sectional view of a still further modification; and

Figures 7, 8 and 9 are transverse cross sections through the structure shown in Figures 1, 2 and 5, respectively.

In the structure shown in Figures 1 and 7, the numeral 1 designates a cutter head or cutter head frame of arcuate cross-section transversely to its length. The cutter head is formed with a rectangular opening, 1a, which is spanned in a lengthwise direction by the shear plate supporting bars 3 within this opening. These bars 3 are parallel to each other and to the closed longitudinal side edges 1b of the opening and are relatively adjacent but spaced somewhat from the respective said edges. The bars 3 are formed on their inside surfaces with projections 4, which are received in openings 5 in the shear plate 6 and hold the medial portion of plate 6 transversely arched. Thus, the resiliency of the medial portion of the shear plate and its tendency to unflex toward the bars 3 tends to maintain automatically the interconnection defined by the projections 4 within the openings 5. It will be noted that the shear plate 6 is formed in its medial portion with a plurality of openings or perforations 6a for the passage of hairs in customary manner. The longitudinal toothed edge portions 7 of the shear plate 6 in this form are bent outwardly to extend at right angles through the space between the bars 3 and the adjacent edges of the opening 1a. Thus, in this form of the invention, there is a re-entrant angle between the outer surface of the protruding longitudinal edge portions 7 and the medial arched portion of the shear plate. The longitudinal edge portions 7 are provided with slots 8 and the extreme outer parts of these edge portions are bent downwardly at right angles about a line 9. The slots 8 extend across the line 9, whereby the lands 10 between the slots 8 may function as free-ended teeth for coaction with the inner cutter 11 in the manner of free-ended cutter teeth.

Beneath and inside the arch of the shear plate 6 an inner cutter 11 is mounted for longitudinal reciprocation. In the example shown in Figures 1, 2, 7 and 8, this inner blade consists of two parts 12 and 13, which are connected to each other to constitute a unitary blade structure. The part 12 consists of an approximately cylindrically curved sheet metal member having a multiplicity of peripheral cuts 14, the sheet metal along one edge of each cut being turned radially outwardly to form a cutting flange 15, the edges of which are mounted to define cylindrical edges for cooperation with the medial arched portion of the shear plate 6, all in accordance with known practice. The second or lower part of the blade 11 is in the form of a flat plate 13 arranged along a chordal plane with respect to the flanges 15. This plate 13 carries cutter teeth 16 in rows along its outer longitudinal edges. These teeth 16 extend through the spaces between the bars 3 and side edges 1b of the opening on both sides of the head and below the edges 7 of the shear plate 6 for coaction with the teeth 10, to provide a pair of long-hair cutters. The inner blade 11 is driven in conventional manner by means of a crank, the pin of which engages in slot 17 in the plate 13. Thus, rotation of the crank by usual means causes reciprocation of the entire inner cutter blade 11.

In the embodiment shown in Figures 2 and 8, the specific interconnection between the supporting bars and shear plate 6 differs from that previously described only in that the bar 3 has on its inside a longitudinal groove 4', which is engaged by bosses 5' on the shear plate 6 for holding the latter. Moreover, in this case, the edge 7' of the shear plate 6 is only slightly bent, while the teeth 16 along the longitudinal edges of the inner blade are bent slightly downwardly to have a common contact or shearing surface with the teeth 10' of the shear plate.

The shear plate 6 is preferably held in such a manner that its arched portion is resiliently urged against the inner blade 11, more particularly against the cutting edges 15 thereof, and is resiliently urged at the same time along its edge 7' against the associated movable row of teeth 16 of the open cutter. Thus, the shear plate is pressed under an initial pre-stress against both parts of the inner blade.

The driving mechanism, the spring arrangement for urging the inner blade against the shear plate and the head carrier of the embodiments of Figures 1 and 2 may be similar in construction to known practice, as illustrated in the example shown in Figures 3 and 4, which will be described hereinafter.

In the example shown in Figures 3 and 4 a shaver housing 20 made of plastic is seen, which contains an electric drive motor, of which only the drive shaft 21 is shown, which extends through the top wall of the housing. A cap 22, made of plastic, is mounted on the top of the housing and is fixed to the housing with the aid of clamping springs 23 having hooked ends which extend behind two noses 24 formed laterally on the protruding central portion of the top wall of the housing 20. The top of the cap 22 has an opening which is closed by a shear plate 6, one longitudinal edge of which (the left one when viewed as in Figure 4) is fixed by rivets, to the cap 22, whereas the opposite longitudinal margin 7 is toothed as in the example shown in Figure 1 and forms a part of the open cutter. The support for the shear plate 6 on the side of the open cutter is again provided by a bar 3. Because the shear plate is held only at its side edges, it is free to deform and under shaving pressure comes into snug engagement with the underlying inner blade 11, which is urged into the arch of the shear plate 6 by springs 25 supported on the top wall of the housing 20.

A crank pin 26 provided the top end of the drive shaft 21 engages a transverse hole of a connecting rod 27. A coupling pin 28 provided on the other end of the connecting rod 27 is mounted in the sheet metal member 13 of the lower blade 11. The pin 26 is freely movable in a transverse slot 17 of this sheet metal member.

In order to hold the inner blade 11, which is resiliently urged into the arch of the shear plate 6, in position when the cap 22 with the shear plate 6 is removed, hook-shaped members 29 are fixed to the housing 20 at both ends of the inner blade and the ends of these hooks extend into the gap between the sheet metal members 12 and 13 of the inner blade 11. Although they do not normally engage these two members, as soon as the cap 22 with the shear plate 6 is removed, the inner blade 11 is urged outwardly by the helical spring 25 until the sheet metal member 13 engages the hooked portions 29 acting as stops.

The example shown in Figures 5 and 9 is generally similar to that of Figure 1, with the difference that the inner blade 11' consists of a cylindrically curved metal strip, in which peripheral grooves 14' are milled, which form cutting edges, and the side edges of this inner blade are provided with a row of cutting teeth 16' in an arrangement similar to that of Figure 1. The cutting teeth 10'' along the lateral edge portions of the shear plate are bent downwards away from the crown of the arched shear plate so that each of the two edge portions at an angle to each other engages one of the bevelled end surfaces of the row of cutting teeth 16' to cooperate therewith as a long-hair cutter.

A transverse web 13' with an oblong hole 17 for reception of a driving crank is attached to the underside of the inner blade 11a.

The example shown in Figure 6 is similar to that of Figure 5 with the difference that the inner blade 11'' is connected to a sheet metal member 13'', which carries rows of cutting teeth 16 on its two side edges as in Figure 1.

The removable cap 22 of the cutter head has on its inside, brackets 31, on which springs 25' are supported, which urge the inner blade 11'', 13'' into the curvature of the shear plate 6. In this construction, not only the shear plate 6, but also the inner blade 11'', 13'', are separated from the housing 20 of the shaver when the cap 22 is removed.

It is apparent that in all the examples of the invention, the free deformability of the shear plate 6 about the members 3 under the action of the shaving pressure ensures a snug engagement between the shear plate 6 and the inner blade 11, 11', or 11'', without need for manufacturing these parts with close tolerances. The preferred construction is such that the arched portion of the shear plate as well as its toothed longitudinal edge portions are permanently in resilient contact with the associated movable inner blade under an initial pre-stress imparted to the shear plate 6 by the bars 3, incident to holding the medial portion of the plate arched, as has been described.

It will be apparent that this arching of the medial portion of the plate 6 will deflect resiliently downwardly the free edges of the teeth 10, 10', 10'', to maintain the close contact thereof with the corresponding inner blade teeth, as necessary to perform an efficient cutting action. The arrangement may also be such that, during the use of the long-hair cutter the inner blade 11 is relieved of the shaving pressure otherwise transmitted by inward pressure against the arched medial portion of the shear blade 6 so that the cooperating teeth of the long-hair cutter may snugly engage each other. However, the rows of teeth of the long-hair cutter are urged apart by the shaving pressure due to upward deflection of teeth 10, 10', 10'' when the closed cutter is used so that additional friction does not occur.

I claim:

1. A dry shaver comprising a cutter head of arcuate cross section in a plane transverse to its length, and formed with a rectangular opening therein having opposed side edges extending longitudinally of said head, said head including a bar fixed thereto within said opening parallel to but spaced from one of said side edges, a resilient flexible shear plate secured to said head within said opening, said shear plate comprising an arched medial portion formed with openings therethrough to receive hairs, and having a toothed longitudinal edge portion extending between said bar and the adjacent side edge of said rectangular opening, and projecting outwardly from said head, said plate being supported by said bar for flexing movement about same, in combination with an inner cutter blade mounted for longitudinal reciprocation beneath said shear plate on the concave side thereof, said blade including a medial portion having arched cutters for cooperation with the arched medial section of said shear plate to define a close-shaving mechanism, said inner cutting blade including a toothed longitudinal edge portion projecting between said bar and said adjacent side edge and projecting outwardly from said head for cooperation with said toothed longitudinal edge portion of the shear plate to therewith define a long-hair cutter, and means within said body resiliently urging said cutter blade into operative engagement with said shear plate.

2. A dry shaver comprising a cutter head of arcuate cross section in a plane transverse to its length and formed with a rectangular opening therein having opposed side edges extending longitudinally of said head, said head having a pair of bars fixed thereto and each parallel to and spaced from one of said side edges, a resilient shear plate secured to said head within said opening, said shear plate comprising an arched medial portion between said bars formed with openings therethrough to receive hairs, and having toothed longitudinal edge portions on opposite sides thereof extending between each said bar and the relatively adjacent side edge of said rectangular opening and projecting outwardly from said head, said plate being supported by said bars for flexing movement about same, in combination with an inner cutter blade mounted for longitudinal reciprocation with respect to said plate on the concave side thereof, said blade including a medial portion, having arched cutters for cooperation with the arched section of said shear plate to define a close-shaving mechanism, said inner cutter blade including toothed longitudinal side edge portions, each projecting between one of said bars and its relatively adjacent side edge of the opening and projecting outwardly from said head for cooperation with one of said toothed longitudinal edge portions of the shear plate to therewith define a long-hair cutter, and means within said body resiliently urging said cutting blade into operative engagement with said shear plate.

3. A dry shaver as defined in claim 2, in which said medial portion of the resilient shear plate is held in arched condition by said bars, the bars and shear plate having interengaging projections and recesses to interconnect said plate to the bars, and the confining action of said bars on the plate, holding the latter in arched position, serves automatically to maintain said interconnection.

4. A dry shaver as defined in claim 3, in which the projections are formed on said shear plate and the recesses are formed in the respective bars.

References Cited in the file of this patent

UNITED STATES PATENTS

| | | |
|---|---|---|
| 2,234,894 | Bruecker | Mar. 11, 1941 |
| 2,234,929 | Lynch | Mar. 11, 1941 |
| 2,263,155 | Wright | Nov. 18, 1941 |
| 2,317,177 | Carissimi | Apr. 20, 1943 |
| 2,339,677 | Burns | Jan. 18, 1944 |
| 2,661,531 | Streng | Dec. 8, 1953 |
| 2,828,836 | Lussier | June 17, 1958 |

FOREIGN PATENTS

| | | |
|---|---|---|
| 171,778 | Austria | July 10, 1952 |
| 304,814 | Switzerland | Aug. 1, 1955 |
| 669,172 | Great Britain | Mar. 26, 1952 |
| 783,834 | Great Britain | Oct. 2, 1957 |